(12) United States Patent
Nishimura (10) Patent No.: US 7,656,068 B2
(45) Date of Patent: Feb. 2, 2010

(54) DYNAMOELECTRIC ROTOR (75) Inventor: Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 498 days.

(21) Appl. No.: 11/592,193

(22) Filed: Nov. 3, 2006

(65) Prior Publication Data
US 2007/0267938 A1 Nov. 22, 2007

(30) Foreign Application Priority Data
May 17, 2006 (JP) ............................. 2006-137849

(51) Int. Cl.
H02K 1/22 (2006.01)
(52) U.S. Cl. .................................... 310/263
(58) Field of Classification Search ................. 310/261, 310/262, 263
See application file for complete search history.

(56) References Cited
U.S. PATENT DOCUMENTS
5,361,011 A 11/1994 York
5,539,265 A * 7/1996 Harris et al. ................ 310/263
2003/0137208 A1* 7/2003 York et al. .................. 310/194
2007/0267936 A1* 11/2007 York ........................... 310/263

FOREIGN PATENT DOCUMENTS
| FR | 2612349 A1 | 9/1988 |
| JP | 42-2570 U | 12/1899 |
| JP | 42-2570 | 2/1967 |
| JP | 58-006058 A | 1/1983 |
| JP | 59-032344 A | 2/1984 |
| JP | 62-31352 A | 2/1987 |
| JP | 04-012652 A | 1/1992 |
| JP | 09-215245 A | 8/1997 |
| JP | 3041881 B2 | 5/2000 |

* cited by examiner

Primary Examiner—Nguyen N Hanh
(74) Attorney, Agent, or Firm—Sughrue Mion, PLLC (57) ABSTRACT Each of first and second pole cores has a boss portion, six core flange portions; and six claw-shaped magnetic pole portions, the first and second pole cores being disposed such that the claw-shaped magnetic pole portions face each other so as to intermesh and leading end surfaces of the boss portions are abutted with each other. The boss portions include coil mount portions in which cross-sectional shapes that are perpendicular to the central axis are hexagons; and abutted portions that have circular cross sections and that are disposed so as to protrude from leading ends of the coil mount portions. Radially-inner surfaces of the claw-shaped magnetic pole portions face side surfaces of the coil mount portions and are parallel to the side surfaces of the coil mount portions at the cross sections that are perpendicular to the central axis.

19 Claims, 7 Drawing Sheets

DYNAMOELECTRIC ROTOR

BACKGROUND OF THE INVENTION

1. Field of the Invention

The present invention relates to a dynamoelectric rotor that is mounted to a vehicle such as a passenger car, or a truck, etc., for example.

2. Description of the Related Art

In conventional automotive alternator rotors, a field coil is wound onto a cylindrical boss portion. Thus, if the rotational acceleration changes greatly, a force acts that rotates the field coil relative to the boss portion due to inertia of the field coil. If this force is great, the field coil may rotate relative to the boss portion, giving rise to misalignments. When misalignments of this kind occur, there is a risk that conducting wires that connect the field coil and slip rings that rotate together with the boss portion may break. When these conducting wires break, changes in magnetic flux no longer occur in the armature, and function as an alternator can no longer be achieved.

In view of these conditions, various rotors have been proposed to prevent rotation of the field coil relative to the boss portion.

In a first conventional rotor, a rotor core is configured so as to be divided into three parts that include: a boss portion onto which a field coil is wound; and a pair of pole cores that are disposed on two sides of the boss portion, and the boss portion is formed so as to have a polygonal prism shape. The field coil is wound onto the boss portion with an insulating material interposed (see Patent Literature 1, for example).

In a second conventional rotor, a rotor core is also configured so as to be divided into three parts that include: a boss portion on which a field coil is wound; and a pair of pole cores that are disposed on two sides of the boss portion. The boss portion is formed so as to have a polyhedral shape that have a plurality of inclined surfaces as side surfaces in which first and second congruent polygonal end surfaces that have rotational symmetry that is centered around a rotating shaft are disposed so as to be rotated around the rotating shaft such that corner portions of the first end surface are positioned centrally on edge portions of the second end surface and the corner portions of the polygons of the first and second end surfaces are formed so as to be joined in a zigzag, and the field coil is wound on the boss portion with an insulating material interposed (see Patent Literature 2, for example).

Patent Literature 1: Japanese Utility Model Publication No. SHO 42-2570 (Gazette)

Patent Literature 2: Japanese Patent No. 3041881 (Gazette)

In both of these conventional rotors, because the rotor cores are configured so as to be divided into three parts that include a boss portion and first and second pole cores that are disposed on two sides of the boss portion, one problem has been that assembly deteriorates as the number of parts is increased.

SUMMARY OF THE INVENTION

The present invention aims to solve the above problems and an object of the present invention is to provide a dynamoelectric rotor that enables rotation of a field coil relative to a boss portion to be prevented and also enables assembly to be improved by reducing the number of parts.

In order to achieve the above object, according to one aspect of the present invention, there is provided a dynamoelectric rotor including: first and second pole cores on which are formed integrally: a boss portion through which a shaft insertion aperture is disposed at a position of a central axis; n core flange portions that are disposed so as to extend radially outward at a uniform angular pitch circumferentially on an outer circumferential edge portion at a first end of the boss portion, where n is an integer; and n claw-shaped magnetic pole portions that are disposed so as to extend and taper toward a second axial end from each of the core flange portions, the first and second pole cores being disposed such that the claw-shaped magnetic pole portions face each other so as to intermesh and leading end surfaces of the boss portions are abutted with each other; a shaft that is press-fitted into the shaft insertion aperture so as to integrate the first and second pole cores; a bobbin that is mounted to the abutted boss portions; and a field coil that is wound onto the bobbin. A cross-sectional shape of the boss portion that is perpendicular to the central axis at a root portion of the core flange portions is an n-sided polygon, and each of the claw-shaped magnetic pole portions faces a side of the cross-sectional shape of the boss portion that is perpendicular to the central axis at the root portions of the core flange portions.

According to the present invention, because the rotor core is configured so as to be divided into first and second pole cores, the number of parts can be reduced and assembly can be improved.

Because the cross-sectional shape of the boss portion that is perpendicular to the central axis at the root portions of the core flange portions is an n-sided polygon, force that rotates the field coil relative to the boss portion is borne by the corner portions of the boss portion at the root portions of the core flange portions, preventing the field coil from rotating.

DETAILED DESCRIPTION OF THE PREFERRED EMBODIMENTS

Embodiment 1

Figure 1:
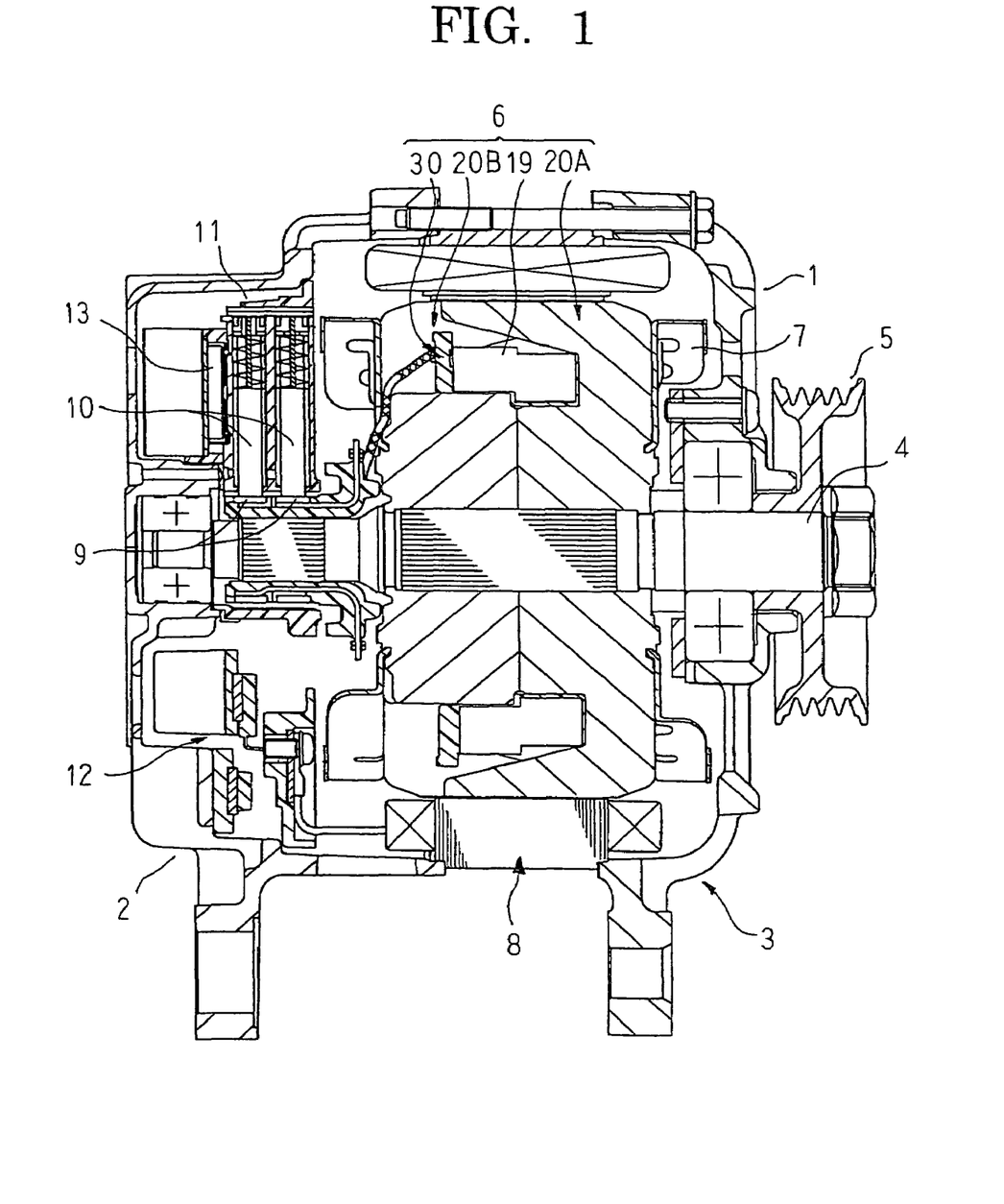
FIG. 1 is a longitudinal section of an automotive alternator according to Embodiment 1 of the present invention.
Figure 2:
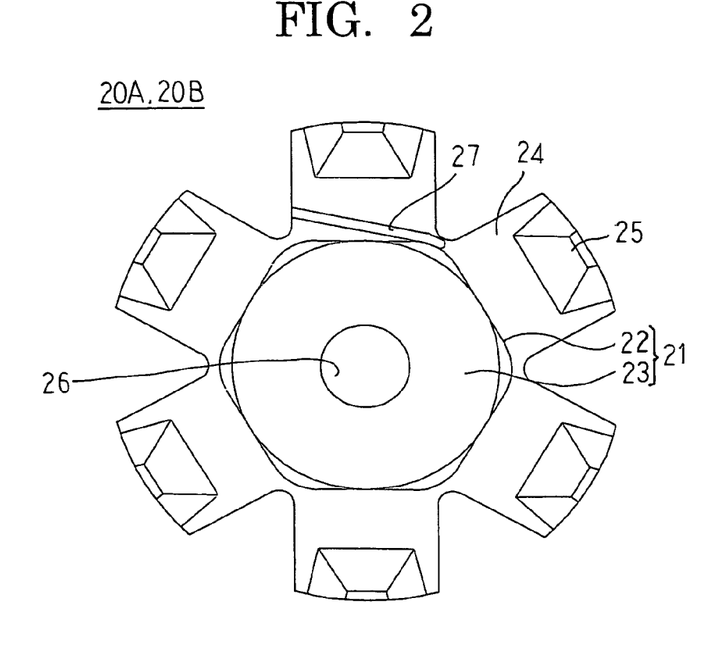
FIG. 2 is a front elevation of a divided pole core in an automotive alternator rotor according to Embodiment 1 of the present invention.
Figure 3:
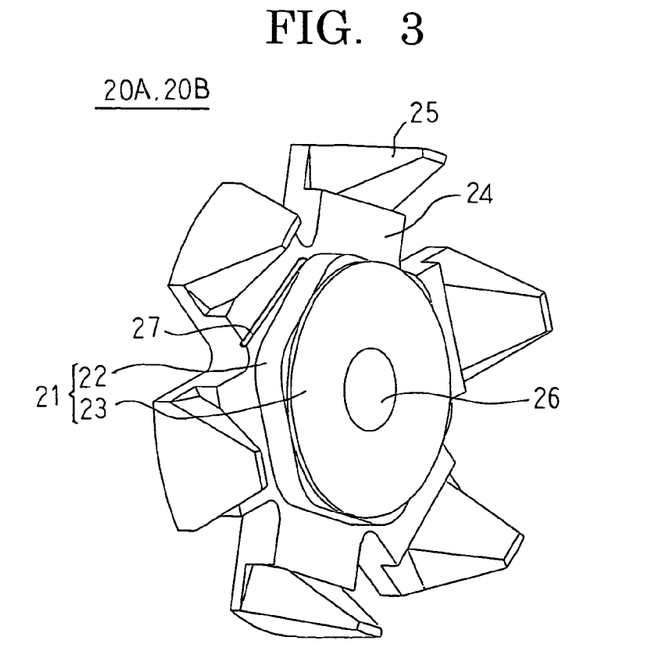
FIG. 3 is a perspective of the divided pole core in the automotive alternator rotor according to Embodiment 1 of the present invention.
Figure 4:
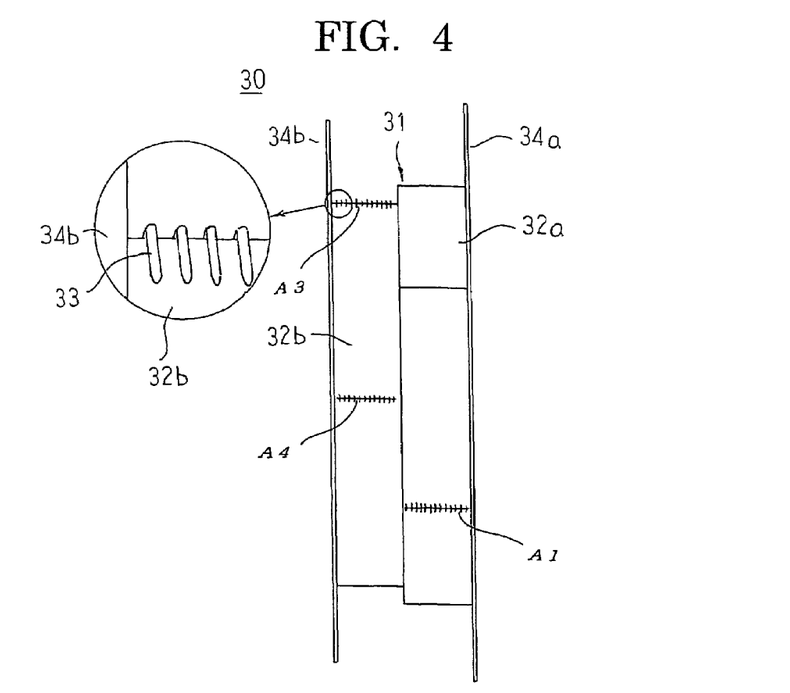
FIG. 4 is a front elevation of a bobbin in the automotive alternator rotor according to Embodiment 1 of the present invention.
Figure 5:
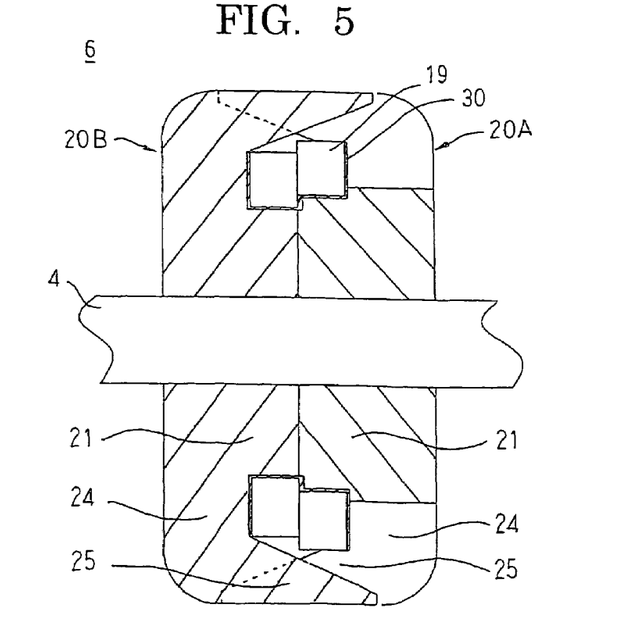
FIG. 5 is a longitudinal section of the automotive alternator rotor according to Embodiment 1 of the present invention.
Figure 6:
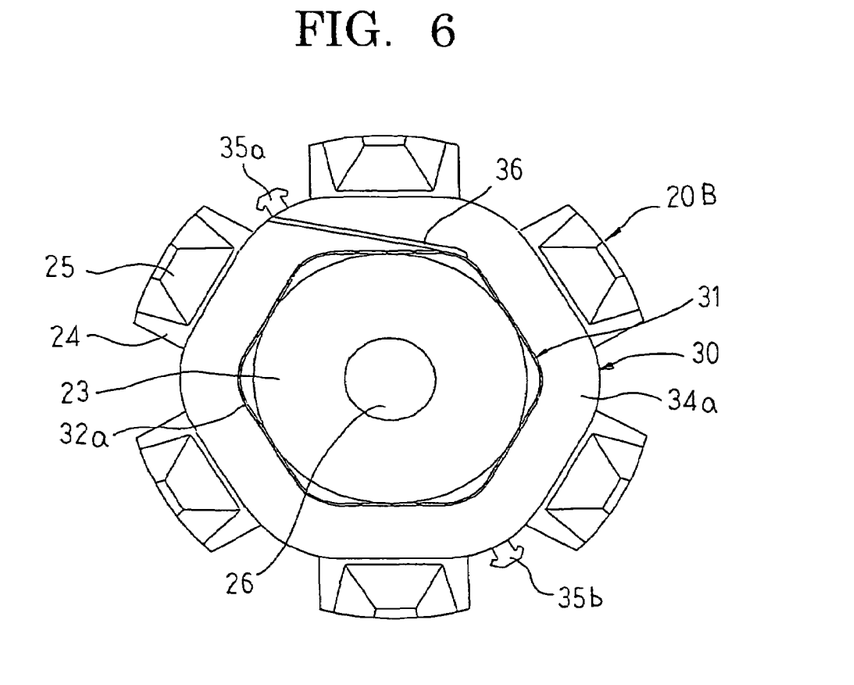
FIG. 6 is a front elevation that shows a state in which the bobbin is mounted to the divided pole core in the automotive alternator rotor according to Embodiment 1 of the present invention.
Figure 7:
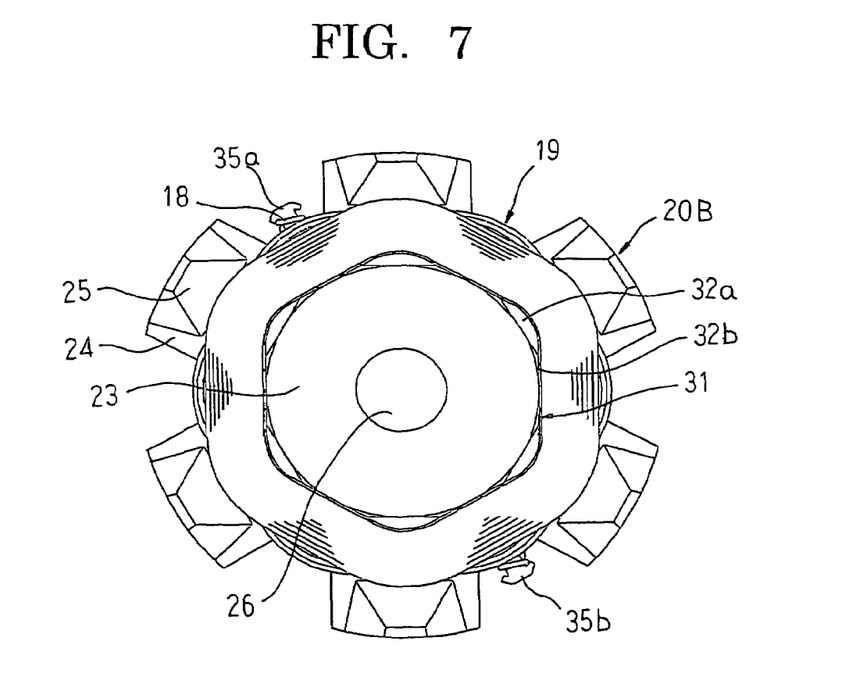
FIG. 7 is a front elevation that shows a state in which a field core is mounted to the divided pole core in the automotive alternator rotor according to Embodiment 1 of the present invention.

FIG. 1 is a longitudinal section of an automotive alternator according to Embodiment 1 of the present invention, FIG. 2 is a front elevation of a divided pole core in an automotive alternator rotor according to Embodiment 1 of the present invention, FIG. 3 is a perspective of the divided pole core in the automotive alternator rotor according to Embodiment 1 of the present invention, FIG. 4 is a front elevation of a bobbin in the automotive alternator rotor according to Embodiment 1 of the present invention, FIG. 5 is a longitudinal section of the automotive alternator rotor according to Embodiment 1 of the present invention, FIG. 6 is a front elevation that shows a state in which the bobbin is mounted to the divided pole core in the automotive alternator rotor according to Embodiment 1 of the present invention, and FIG. 7 is a front elevation that shows a state in which a field core is mounted to the divided pole core in the automotive alternator rotor according to Embodiment 1 of the present invention. Moreover, FIG. 6 shows a state in which a second tube body and a second bobbin flange portion of the bobbin have been removed, and FIG. 7 shows a state in which the second bobbin flange portion of the bobbin has been removed.

In FIG. 1, an automotive alternator includes: a case 3 that is constituted by a front bracket 1 and a rear bracket 2 that are each approximately bowl-shaped and made of aluminum; a shaft 4 that is rotatably supported by the case 3; a pulley 5 that is fixed to an end portion of the shaft 4 that projects outward at a front end of the case 3; a rotor 6 that is fixed to the shaft 4 and accommodated inside the case 3; fans 7 that are fixed to two axial end surfaces of the rotor 6; a stator 8 that is fixed to an inner wall surface of the case 3 so as to surround an outer circumference of the rotor 6; slip rings 9 that are fixed to a rear end of the shaft 4 so as to supply electric current to the rotor 6; a pair of brushes 10 that are disposed inside the case 3 so as to slide on the slip rings 9; a brush holder 11 that houses the brushes 10; a rectifier 12 that is electrically connected to the stator 8 so as to rectify alternating current generated in the stator 8 into direct current; and a regulator 13 that adjusts magnitude of alternating voltage generated in the stator 8.

The rotor 6 is constituted by: a field coil 19 that generates magnetic flux on passage of electric current; first and second pole cores 20A and 20B that are disposed so as to cover the field coil 19 such that magnetic poles are formed by the magnetic flux; and a bobbin 30 onto which the field coil 19 is wound.

Operation of an automotive alternator that is configured in this manner will now be explained.

First, electric current is supplied from a battery (not shown) through the brushes 10 and the slip rings 9 to the field coil 19 of the rotor 6, generating magnetic flux. Claw-shaped magnetic pole portions of the first pole core 20A are magnetized into North-seeking (N) poles by this magnetic flux, and claw-shaped magnetic pole portions of the second pole core 20B are magnetized into South-seeking (S) poles. At the same time, rotational torque from an engine is transmitted from an output shaft of the engine through a belt and the pulley 5 to the shaft 4, rotating the rotor 6. Thus, a rotating magnetic field is applied to a stator winding of the stator 8, generating electromotive force in the stator winding. This alternating-current electromotive force is rectified into direct current by the rectifier 12 so as to charge the battery or be supplied to an electric load.

Next, configuration of the rotor 6 will be explained in detail.

As shown in FIGS. 2 and 3, the first pole core 20A is constituted by: a boss portion 21; six core flange portions 24 that are disposed so as to extend radially outward from an outer circumferential first end edge portion of the boss portion 21 at a uniform angular pitch circumferentially; and six claw-shaped magnetic pole portions 25 disposed so as to extend toward a second axial end from tip portions of the respective core flange portions 24.

The boss portion 21 has: a coil mount portion 22 that is formed into a hexagonal prism that has a hexagonal cross-sectional shape perpendicular to a central axis and in which respective side surfaces are flat surfaces that are parallel to the central axis; and an abutted portion 23 that has a circular cross-sectional shape perpendicular to the central axis that is disposed so as to protrude from a second end of the coil mount portion 22. A shaft insertion aperture 26 is disposed through the boss portion 21 at a central axial position. At a boundary surface between the coil mount portion 22 and the abutted portion 23, the abutted portion 23 touches each of the side surfaces of the coil mount portion 22 internally. In addition, curved surfaces are formed on corner portions of the hexagonal prism of the coil mount portion 22, i.e., rounding is applied.

The claw-shaped magnetic pole portions 25 are disposed so as to face the respective side surfaces of the coil mount portion 22. Each of the claw-shaped magnetic pole portions 25 is formed so as to have a tapered shape. Specifically, circumferential dimensions form an approximately trapezoidal shape that becomes gradually narrower from a base portion toward a leading end, radially-inner surfaces are formed so as to have inclined surfaces such that inside diameters thereof gradually increase from the base portion toward the leading end, and radially-outer surfaces are formed so as to have a cylindrical outer circumferential surface shape that is centered around the central axis. The radially-inner surfaces of the claw-shaped magnetic pole portions 25 are parallel to the side surfaces of the facing coil mount portion 22 in a cross section that is perpendicular to the central axis.

A housing groove 27 that houses a protruding portion that is disposed so as to protrude from an outer wall surface of a first bobbin flange portion 34a of the bobbin 30 that is described below is recessed into an inner wall surface of the core flange portions 24.

Moreover, the second pole core 20B is formed so as to have an identical shape to the first pole core 20A.

As shown in FIG. 5, a rotor core is configured by disposing the first and second pole cores 20A and 20B so as to face each other so as to be offset by 30 degrees around a central axis such that the claw-shaped magnetic pole portions 25 intermesh with each other, abutting the abutted portions 23, and integrating the first and second pole cores 20A and 20B by pressing the shaft 4 into the shaft insertion aperture 26. Moreover, the two boss portions 21 with the abutted portions 23 abutted constitute a field core onto which the field coil 19 is wound.

As shown in FIG. 4, the bobbin 30 is molded integrally using a synthetic resin and has: a drum portion 31 in which first and second tube bodies 32a and 32b that have hexagonal cross sections are offset by 30 degrees around a central axis such that central portions of the respective sides of the first and second tube bodies 32a and 32b cross each other are integrated so as to be linked; and first and second bobbin flange portions 34a and 34b that are disposed so as to extend radially outward from two ends of the drum portion 31. Walls are disposed so as to fill gaps in linking portions between the first and second tube bodies 32a and 32b.

An inner circumferential surface shape of the drum portion 31 approximately matches an outer circumferential surface shape of the field core when the two boss portions 21 are offset by 30 degrees around the central axis and abutted. Corner portions of an inner circumferential surface of the drum portion 31 are formed so as to have a curved surface shape that conforms to the curved surface shape of the corner portions of the coil mount portion 22.

As shown in FIG. 6, external shapes of the first and second bobbin flange portions 34a and 34b form hexagons in a similar manner to the first and second tube bodies 32a and 32b, and curved surfaces are formed on corner portions. Two hooks 35a and 35b that engage a winding start portion and a winding finish portion, respectively, of the coil 18 are disposed on corner portions of the first bobbin flange portion 34a. A coil housing groove 36 is recessed into an inner wall surface of the first bobbin flange portion 34a so as to extend from a vicinity of the hook 35a that engages the winding start portion of the coil 18 to a vicinity of a corner portion of the first tube body 32a that is offset by one in the coil winding direction. In addition, although not shown, a protruding portion is disposed so as to protrude from an outer wall surface of the first bobbin flange portion 34a so as to house the coil housing groove 36.

Figure 8:
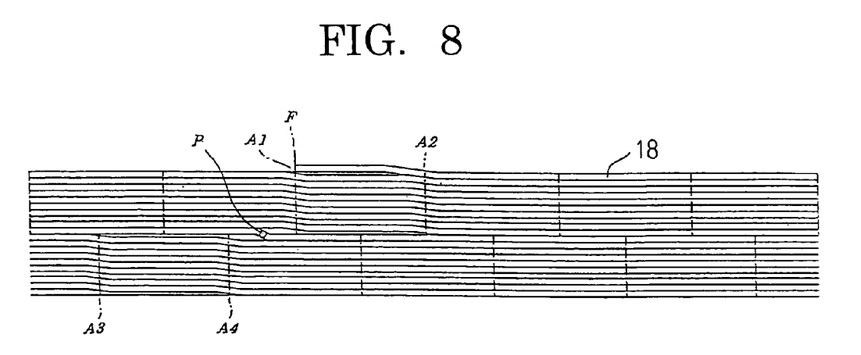
FIG. 8 is a developed projection that explains a state in which a first layer of coil is wound onto the bobbin in the automotive alternator rotor according to Embodiment 1 of the present invention.
Figure 9:
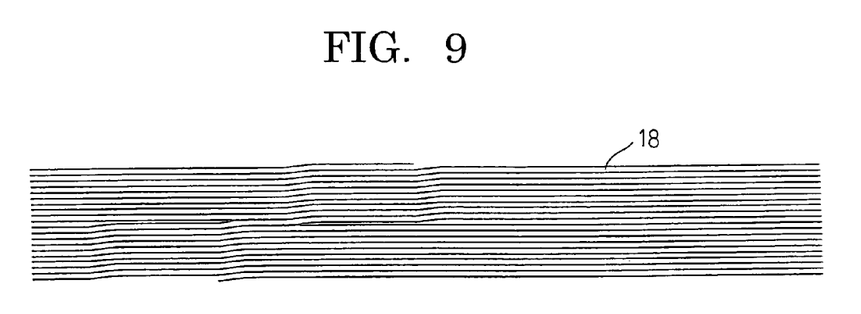
FIG. 9 is a developed projection that explains a state in which a second layer of coil is wound onto the bobbin in the automotive alternator rotor according to Embodiment 1 of the present invention.
Figure 10:
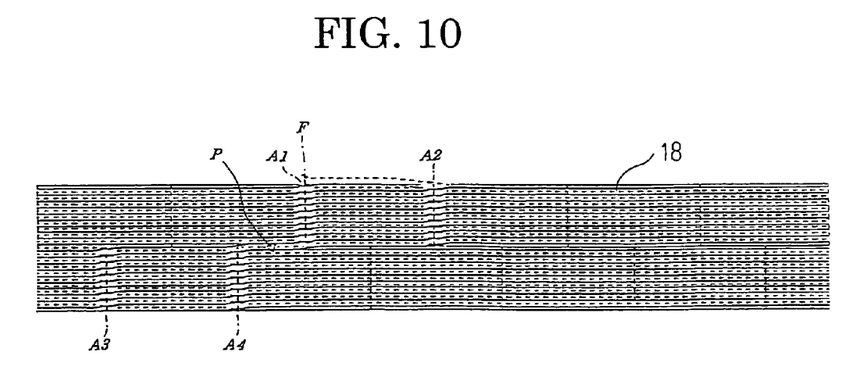
FIG. 10 is a developed projection that explains a relationship between the first layer of coil and the second layer of coil that are wound onto the bobbin in the automotive alternator rotor according to Embodiment 1 of the present invention.

Next, a method for winding the field coil 19 will be explained with reference to FIGS. 8 through 10. FIG. 8 is a developed projection that explains a state in which a first layer of coil is wound onto the bobbin in the automotive alternator rotor according to Embodiment 1 of the present invention, FIG. 9 is a developed projection that explains a state in which a second layer of coil is wound onto the bobbin in the automotive alternator rotor according to Embodiment 1 of the present invention, and FIG. 10 is a developed projection that explains a relationship between the first layer of coil and the second layer of coil that are wound onto the bobbin in the automotive alternator rotor according to Embodiment 1 of the present invention. Moreover, in FIGS. 8 and 10, F indicates the winding start portion of the coil 18, and A1 through A4 indicate corner portions at which coil guide portions are formed. In FIG. 10, solid lines represent the second layer of coil 18, and broken lines represent the first layer of coil 18.

First, the coil 18 is wound onto the hook 35a, and is inserted into the coil housing groove 36 while being led to the first tube body 32a of the drum portion 31. Here, the coil 18 is led out from the inner wall surface of the first bobbin flange portion 34a to a corner portion of the hexagon of the first tube body 32a, and is wound onto the first tube body 32a from there.

Here, as shown in FIGS. 4, 8, and 10, coil guide portions 33 are disposed so as to protrude from two circumferentially adjacent pairs of corner portions A1 through A4 on the first and second tube bodies 32a and 32b. The coil guide portions 33 that are formed on the first (third) corner portion A1 (A3) that is rearward in the coil winding direction are inclined at a predetermined angle such that the coil 18 that has been wound up to that point is shifted by half a coil thickness axially, and are arrayed at a pitch of one coil thickness axially. The coil guide portions 33 that are formed on the second (fourth) corner portion A2 (A4) that is forward in the coil winding direction are inclined at a predetermined angle such that the coil 18 that has been shifted by half a coil thickness at the rearward coil guide portions 33 is shifted by another half a coil thickness axially, and are arrayed at a pitch of one coil thickness axially.

Thus, the coil 18 is shifted by half a coil thickness toward a first axial end (toward the second bobbin flange portion 34b) at each of two coil guide portions 33 while being wound onto the first tube body 32a for one turn. The coil 18 is thereby shifted by a coil thickness toward the first axial end in each turn while being wound onto the first tube body 32a.

When one layer of the coil 18 has been wound onto the first tube body 32a in this manner, the coil 18 is passed onto the second tube body 32b at a side intersecting portion between a side surface of the first tube body 32a and a side surface of the second tube body 32b. This side intersecting portion is indicated by point P in FIGS. 8 and 10. Here, the side surfaces onto which the coil 18 is being wound visually change from an ascending gradient to a descending gradient in the winding direction of the coil 18 at the side intersecting portion P. Consequently, after the coil 18 has been passed from the first tube body 32a to the second tube body 32b at the side intersecting portion P, it can be wound onto the second tube body 32b without becoming prominent. Because the side intersecting portion P corresponds to a floor portion of a V-shaped groove that is constituted by the sides that intersect with each other, the coil 18 can be passed from the first tube body 32a to the second tube body 32b in a stable state.

The coil 18 that has been passed onto the second tube body 32b is shifted in a similar manner by half a coil thickness toward the first axial end at each of two coil guide portions 33 while being wound onto the second tube body 32b for one turn. Then, when one layer of coil 18 has been wound onto the second tube body 32b, winding of the second layer of coil 18 is commenced.

The second layer of coil 18 is shifted by half a coil thickness toward a second axial end (toward the first bobbin flange portion 34a) at each of the third and fourth corner portions A3 and A4 while being wound on top of the first layer of coil 18 for one turn. Then, when one layer of the coil 18 has been wound on top of the first layer of coil 18 on the second tube body 32b, the coil 18 is passed onto the first tube body 32a through the side intersecting portion P. Because the coil 18 must be passed from the fourth corner portion A4 of the second tube body 32b to the first corner portion A1 of the first tube body 32a at the side intersecting portion P, the coil 18 is in a prominent state at the side intersecting portion P. Then, a second layer and a third layer of coil 18 are wound on the first tube body 32a, and as it once again passes to the second tube body 32b through the first tube body 32a at the side intersecting portion P, the coil 18 must pass to the second tube body 32b by crossing over the coil 18 that is in a prominent state. As a result, there is a danger that the wire of the coil 18 that is in the prominent state may break. Thus, it is desirable to eliminate the prominence of the coil 18 at the side intersecting portion P when it is passed from the fourth corner portion A4 of the second tube body 32b to the first corner portion A1 of the first tube body 32a by lowering the height of an edge portion of the fourth corner portion A4 of the second tube body 32b near the first tube body 32a by approximately one coil thickness and the height of an edge portion of the first corner portion A1 of the first tube body 32a near the second tube body 32b by approximately one coil thickness.

The coil 18 that has been passed onto the first tube body 32a is wound in a similar manner into one layer on top of the first layer of coil 18 on the first tube body 32*a*. Here, the coil 18 is similarly shifted by half a coil thickness toward the second axial end at the each of the first and second corner portions A1 and A2 as it is being wound for one turn.

Because the coil 18 is shifted in this manner by half a coil thickness axially at each of two places as it is being wound for one turn, the number of turns of coil 18 that the coil 18 spans each time it crosses the coil 18 in the layer below is one. Thus, since the coil 18 crosses only one turn of coil 18 in the layer below, the cross-sectional shape of the coil 18 can be easily deformed, enabling coil height at the crossed portions to be made lower. Coil height at the crossed portions can also be made lower because the portion of the coil 18 that spans the coil 18 in the layer below as it is being wound for one turn is distributed between two positions.

The coil 18 is wound into a predetermined number of layers by repeating the operation described above, and then wound onto the hook 35*b* to obtain the bobbin 30 onto which the field coil 19 has been wound. Here, because the coil 18 is wound such that in adjacent layers the turns of coil 18 in the upper layer are positioned between adjacent turns of coil 18 in the lower layer ("staggered stacking"), coil height at the edge portions of the hexagon can be made lower. Because the coil 18 is shifted axially at the corner portions A1 through A4, the coil 18 does not cross on top of the side surfaces of the first and second tube bodies 32*a* and 32*b*, enabling winding space to be used effectively. In addition, because the coil 18 is shifted by a total of one coil thickness axially by shifting it by half a coil thickness axially twice in each turn as it is wound, the coil 18 can be wound so as to be arrayed neatly. Furthermore, because the coil 18 is shifted by half a coil thickness axially at two contiguous corner portions as it is being wound for one turn, dead space that results from shifting the coil 18 axially is reduced, and coil winding space can be utilized effectively, enabling space factor to be increased.

Because the third and fourth corner portions A3 and A4 that shift the coil 18 axially on the second tube body 32*b* and the first and second corner portions A1 and A2 that shift the coil 18 axially on the first tube body 32*a* are lined up so as to be contiguous in the coil winding direction on mutually opposite sides of the side intersecting portion P, dead space that results from shifting the coil 18 axially is reduced, and coil winding space can be utilized effectively, enabling space factor to be increased.

As shown in FIG. 7, the coil 18 that has been wound in this manner forms an approximately hexagonal shape that rises slightly at the corner portions. An approximately hexagonal coil group that is wound onto the first tube body 32*a* and an approximately hexagonal coil group that is wound onto the second tube body 32*b* are offset by 30 degrees around the central axis. Because the corner portions of the first and second tube bodies 32*a* and 32*b* have curved surfaces, coil height at the corner portions can be made lower.

Next, a method for assembling the rotor 6 will be explained.

First, the field coil 19 is prepared by winding the coil 18 onto the bobbin 30 following the procedure described above.

Next, as shown in FIG. 7, the boss portion 21 of the second pole core 20B is inserted into the first tube body 32*a* from a side near the first bobbin flange portion 34*a* of the bobbin 30. At this time, the protruding portion that is disposed so as to protrude from the outer wall surface of the first bobbin flange portion 34*a* is housed inside the housing groove 27 that is recessed into the inner wall surface of the core flange portions 24. The hooks 35*a* and 35*b* are positioned between adjacent core flange portions 24 and the corner portions of the coil group that is wound onto the second tube body 32*b* face the claw-shaped magnetic pole portions 25 of the second pole core 20B.

Next, the boss portion 21 of the first pole core 20A is inserted into the second tube body 32*b* from a side near the second bobbin flange portion 34*b* of the bobbin 30 and the abutted portions 23 are abutted with each other. At this time, the walls that are disposed so as to fill the gaps in the linking portions between the first and second tube bodies 32*a* and 32*b* are housed in stepped portions in the abutted portions 23 of the boss portions 21.

The first and second pole cores 20A and 20B are subsequently integrated by pressing the shaft 4 into the shaft insertion aperture 26. Here, knurls are formed on the press-fitted portion of the shaft 4, and the first and second pole cores 20A and 20B are fixed by the knurls of the shaft 4 biting into the shaft insertion aperture 26. Next, portions of the first and second pole cores 20A and 20B in the vicinity of the shaft insertion aperture 26 are crimped to fix the shaft 4 and the first and second pole cores 20A and 20B even more firmly.

Next, the fans 7 are welded to the end surfaces of the first and second pole cores 20A and 20B. Then the slip rings 9 are press-fitted onto the shaft 4, and the coil 18 that has been wound onto the hooks 35*a* and 35*b* is connected to terminals of the slip rings 9.

In addition, the rotor 6 that has been prepared in this manner is measured for imbalances. If the amount of imbalance exceeds a specified value, the amount of imbalance is adjusted so as to be less than or equal the specified value by shaving off portions of the first and second pole cores 20A and 20B, boring apertures, or attaching weights, etc. The bearings are subsequently press-fitted onto the shaft 4 to complete the rotor 6.

According to Embodiment 1, because the rotor core is divided in two parts that each have a boss portion 21, core flange portions 24, and claw-shaped magnetic pole portions 25, i.e., the first and second pole cores 20A and 20B, the number of parts is reduced, improving assembly of the rotor, and enabling the rotor to be manufactured easily.

Because the first and second pole cores 20A and 20B are configured so as to have identical shapes, the number of parts is further reduced, enabling the rotor core to be prepared inexpensively.

Now, in the conventional rotors of the cited Literature 1 and 2, radially-inner surfaces of the claw-shaped magnetic poles of the pole cores are formed so as to have a shape like an outer circumferential surface of a cone that is centered around the rotating shaft. Thus, edge portions at first and second circumferential ends of the radially-inner surfaces of the claw-shaped magnetic poles may interfere with a field coil that is wound onto a boss portion that has a multifaceted prism shape. Because the percentage of space occupied by the field coil relative to the space that the field coil can be wound in, i.e., the space factor, is reduced as a result, flux change imparted to the armature is also reduced, decreasing efficiency in the alternator.

However, in Embodiment 1, because the radially-inner surfaces of the claw-shaped magnetic pole portions 25 are formed into planes that are parallel to the side surface of the coil mount portion 22 in a cross section that is perpendicular to the central axis, edge portions at first and second circumferential ends of the radially-inner surfaces of the claw-shaped magnetic pole portions 25 will not interfere with the field coil 19 that is wound onto the coil mount portion 22. Thus, the percentage of space occupied by the field coil 19 relative to the space that the field coil 19 can be wound in, i.e., the space factor, can be increased, enabling efficiency in the alternator to be increased.

Because the field core is configured by abutting two hexagonal prism coil mount portions 22 so as to be rotated around a central axis by 30 degrees, the side surfaces of the coil mount portions 22 face base portions of the radially-inner surfaces of the claw-shaped magnetic pole portions 25, and corner portions of the coil mount portions 22 face tip end portions of the radially-inner surfaces of the claw-shaped magnetic pole portions 25. Thus, because a large distance between the tip end portions of the radially-inner surfaces of the claw-shaped magnetic pole portions 25 and the coil mount portions 22 can be ensured, interference between the corner portions of the field coil 19 where coil height is raised and the radially-inner surfaces of the claw-shaped magnetic pole portions 25 is suppressed, enabling space factor to be increased.

Because the bobbin 30 onto which the coil 18 has been wound is mounted onto the boss portions 21 of the first and second pole cores 20A and 20B, the operation of winding the coil 18 can be performed in a state in which there are no claw-shaped magnetic pole portions 25, improving workability when winding the coil 18.

Because the walls are disposed so as to fill the gaps in the linking portions between the first and second tube bodies 32a and 32b, strength at the linking portions of the first and second tube bodies 32a and 32b can be increased, and insulation between the field coil 19 and the boss portion 21 can be ensured.

The coil mount portions 22 of the first and second pole cores 20A and 20B are formed into hexagonal prisms, and the drum portion 31 of the bobbin 30 onto which the field coil 19 is wound is formed so as to have an inner circumferential surface shape that approximately matches the outer circumferential surface shape of the coil mount portions 22. Thus, the field coil 19 is prevented from rotating relative to the boss portion 21 even if rotational acceleration acts on the field coil 19. As a result, the occurrence of breakage of the coil 18 that connects the slip rings 9 and the field coil 19 is suppressed.

Because the coil mount portions 22 of the boss portions 21 are formed into hexagonal prisms, a large space factor can be ensured in the field coil 19 while increasing the magnetic path cross-sectional area compared to pole cores that have circular boss portions, enabling an optimal alternator to be achieved in which generated power is increased and field loss is reduced.

Because the abutted portions 23 of the first and second pole cores 20A and 20B are formed so as to have an identical circular cross section, abutted surfaces can be aligned when abutting the abutted portions 23 by rotating the first and second pole cores 20A and 20B around a central axis, enabling magnetic flux leakage at end surfaces of the boss portions 21 to be significantly reduced. It is preferable to reduce this magnetic flux leakage since it does not contribute to power generation, increases the magnetic flux density of the pole core, and gives rise to magnetic saturation.

Because the hooks 35a and 35b that engage the coil 18 are disposed on corner portions of the first bobbin flange portion 34a of the bobbin 30, the hooks 35a and 35b are positioned between core flange portions 24 when the bobbin 30 is mounted to the first and second pole cores 20A and 20B, facilitating connection between the coil 18 and the terminals of the slip rings 9.

Because the coil housing groove 36 is recessed into the inner wall surface of the first bobbin flange portion 34a so as to extend from a vicinity of the hook 35a that engages the winding start portion of the coil 18 to a vicinity of corner portion of the first tube body 32a that is offset by one in the coil winding direction, the coil 18 can be wound onto the hook 35a, then housed inside the coil housing groove 36 while being led to the first tube body 32a and wound onto the first tube body 32a. Thus, because the portion of the coil 18 that is led out from the hook 35a to the first tube body 32a does not protrude from the first bobbin flange portion 34a, it will not interfere with the coil 18 that is wound into multiple layers on the first tube body 32a, enabling the coil 18 to be wound into multiple layers in an orderly and neatly arrayed state. Because the coil 18 is led to a corner portion of the first tube body 32a from inside the coil housing groove 36, even if tension is applied to the coil 18, the coil 18 is pressed against the corner portion of the first tube body 32a and will not stand out, stabilizing the winding start position.

Moreover, in Embodiment 1 above, the corner portions of the hexagonal prisms of the coil mount portions 22 of the boss portions 21 of the first and second pole cores 20A and 20B are formed so as to have curved surfaces, but the corner portions of the hexagonal prism shapes of the coil mount portions 22 do not need to have curved surfaces.

Since the height of the field coil 19 at to the corner portions can be adjusted by adjusting the magnitude of the curved surfaces of the corner portions of the coil mount portions 22, it is desirable for the magnitude of the curved surfaces to be adjusted so as to fit with the surface shape of radially-inner surfaces of the claw-shaped magnetic pole portions 25, and the amount of winding in the field coil 19, etc.

Chamfering may be also applied to the corner portions of the coil mount portions 22 instead of rounding. In that case, the height of the field coil 19 at the corner portions can also be adjusted by adjusting the planar size of the chamfer.

In Embodiment 1 above, the first layer of coil 18 passes from the first tube body 32a to the second tube body 32b through the side intersecting portion P, but the first layer of coil 18 may also be passed from the first tube body 32a to the second tube body 32b through a coil pass portion other than the side intersecting portion P. In that case, first and second coil engaging portions are predisposed on the first and second tube bodies 32a and 32b, respectively, on mutually opposite sides of the coil pass portion. The first layer of coil 18 can be wound onto the first tube body 32a, then engaged in the first coil engaging portion, the coil winding direction changed, and the coil 18 passed to the second tube body 32b through the coil pass portion. Next, the coil 18 that has been passed to the second tube body 32b is engaged in the second coil engaging portion, the coil winding direction changed, and then the coil 18 can be wound onto the second tube body 32b.

Each of the side surfaces of the hexagonal prism coil mount portions 22 is formed so as to have a flat surface that is parallel to a central axis, but the coil mount portions may also be formed so as to have a truncated hexagonal cone shape that has a gradient corresponding to a draft gradient during casting.

The drum portion 31 of the bobbin 30 is formed so as to have an approximately identical inner circumferential surface shape so as to match the outer circumferential surface shape of the boss portions 21. Here, assembly of the bobbin 30 onto which the field coil 19 has been wound and the first and second pole cores 20A and 20B is facilitated if a slight clearance is left between the drum portion 31 and the boss portions 21.

If a lug is predisposed on an inner circumferential surface of the drum portion 31, subsequent operations of transportation and post-processing will be facilitated because the bobbin 30 is less likely to dislodge once the bobbin 30 onto which the field coil 19 has been wound and the first and second pole cores 20A and 20B have been assembled.

The bobbin 30 and the first and second pole cores 20A and 20B may also be fixed by applying a resin such as an adhesive, etc., by dripping it into gaps between the bobbin 30 and the boss portions 21 and gaps between the bobbin 30 and the core flange portions 24. In that case, movement of the field coil 19 due to angular acceleration of the rotor 6 can be reliably prevented. Because the heat of the field coil 19 can escape to the first and second pole cores 20A and 20B, cooling of the field coil 19 is also improved.

If a resin, or a varnish, etc., is impregnated into, applied to, or dripped onto the field coil 19 that is wound onto the bobbin 30, thermal conduction from the field coil 19 through the bobbin 30 to the first and second pole cores 20A and 20B can be increased.

The coil guide portions are disposed on two corner portions, but coil guide portions may also be disposed on the other four corner portions. In that case, the additionally disposed coil guide portions will guide the coil in a direction that is perpendicular to the axial direction, enabling the coil to be wound in an even more neatly arrayed state.

Embodiment 2

Figure 11:
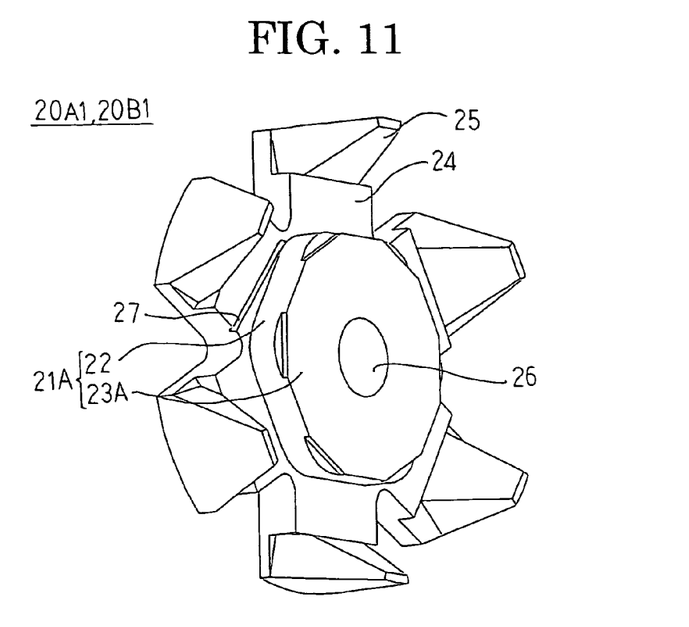
FIG. 11 is a perspective of a divided pole core in an automotive alternator rotor according to Embodiment 2 of the present invention.

FIG. 11 is a perspective of a divided pole core in an automotive alternator rotor according to Embodiment 2 of the present invention.

In FIG. 11, an abutted portion 23A of a boss portion 21A is formed so as to have a dodecagonal cross-sectional shape in which spacing between sides that face each other (opposite sides) is made equal to that of the coil mount portions 22. Centers of the respective sides of the abutted portions 23A are formed so as to be aligned with centers and corner portions of respective sides of a coil mount portion 22 that has a hexagonal cross section.

Moreover, the rest of this embodiment is configured in a similar manner to Embodiment 1 above.

In Embodiment 2, because the abutted portions 23A of first and second pole cores 20A1 and 20B1 are formed so as to have an identical dodecagonal cross-sectional shape, the abutted portions 23A can be abutted with abutted surfaces aligned when the first and second pole cores 20A1 and 20B1 are rotated around a central axis by 30 degrees.

Consequently, similar effects to those in Embodiment 1 above can also be achieved in Embodiment 2.

Embodiment 3

Figure 12:
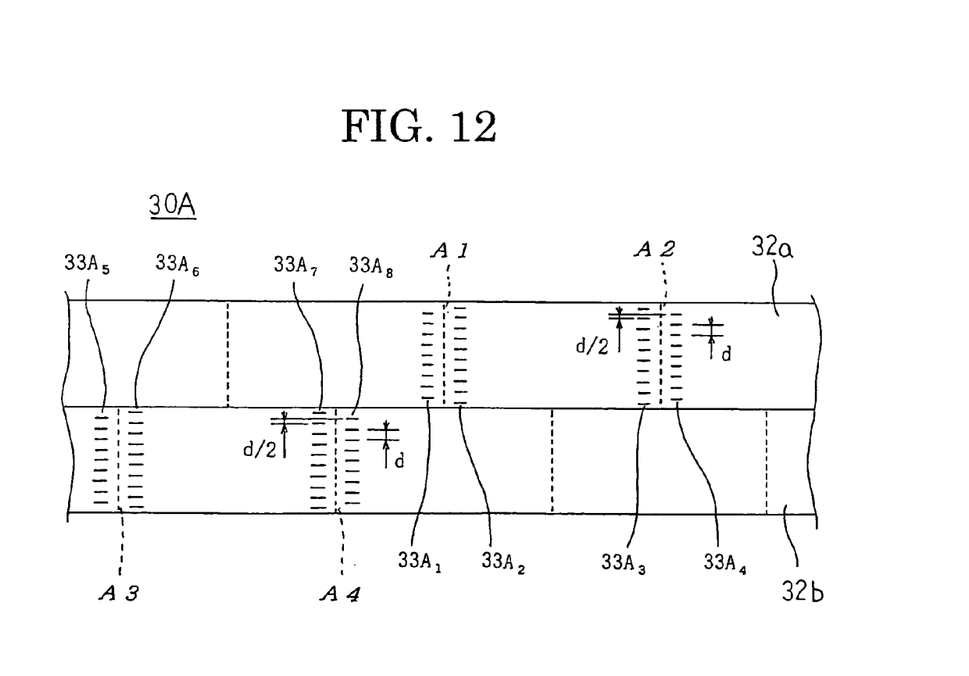
FIG. 12 is a developed projection of a drum portion of a bobbin in an automotive alternator rotor according to Embodiment 3 of the present invention.

FIG. 12 is a developed projection of a drum portion of a bobbin in an automotive alternator rotor according to Embodiment 3 of the present invention.

In FIG. 12, first coil guide portions $33A_1$ are arrayed at a pitch of a coil thickness (d) axially on a side surface of a first tube body 32a that is positioned rearward in a direction of coil winding from a first corner portion A1 in close proximity to the first corner portion A1. Second coil guide portions $33A_2$ are similarly arrayed at a pitch of a coil thickness (d) axially on a side surface of the first tube body 32a that is positioned forward in a direction of coil winding from the first corner portion A1 in close proximity to the first corner portion A1 so as to be offset by half a coil thickness (d/2) axially relative to the first coil guide portions $33A_1$.

Third coil guide portions $33A_3$ are arrayed at a pitch of a coil thickness (d) axially on a side surface of the first tube body 32a that is positioned rearward in a direction of coil winding from a second corner portion A2 (the side surface on which the second coil guide portions $33A_2$ are arrayed) in close proximity to the second corner portion A2. Fourth coil guide portions $33A_4$ are similarly arrayed at a pitch of a coil thickness (d) axially on a side surface of the first tube body 32a that is positioned forward in a direction of coil winding from the second corner portion A2 in close proximity to the second corner portion A2 so as to be offset by half a coil thickness (d/2) axially relative to the third coil guide portions $33A_3$. Moreover, axial positions of the second coil guide portions $33A_2$ and the third coil guide portions $33A_3$ are aligned.

Fifth coil guide portions $33A_5$ are arrayed at a pitch of a coil thickness (d) axially on a side surface of a second tube body 32b that is positioned rearward in a direction of coil winding from a third corner portion A3 in close proximity to the third corner portion A3. Sixth coil guide portions $33A_6$ are similarly arrayed at a pitch of a coil thickness (d) axially on a side surface of the second tube body 32b that is positioned forward in a direction of coil winding from the third corner portion A3 in close proximity to the third corner portion A3 so as to be offset by half a coil thickness (d/2) axially relative to the fifth coil guide portions $33A_5$.

Seventh coil guide portions $33A_7$ are arrayed at a pitch of a coil thickness (d) axially on a side surface of the second tube body 32b that is positioned rearward in a direction of coil winding from a fourth corner portion A4 (the side surface on which the sixth coil guide portions $33A_6$ are arrayed) in close proximity to the fourth corner portion A4. Eighth coil guide portions $33A_8$ are similarly arrayed at a pitch of a coil thickness (d) axially on a side surface of the second tube body 32b that is positioned forward in a direction of coil winding from the fourth corner portion A4 in close proximity to the fourth corner portion A4 so as to be offset by half a coil thickness (d/2) axially relative to the seventh coil guide portions $33A_7$. Moreover, axial positions of the sixth coil guide portions $33A_6$ and the seventh coil guide portions $33A_7$ are aligned.

Moreover, the rest of this embodiment is configured in a similar manner to Embodiment 1 above.

In a bobbin 30A that is configured in this manner, the coil 18 passes between the first coil guide portions $33A_1$, is shifted by half a coil thickness axially at the first corner portion A1, and then passes between the second coil guide portions $33A_2$. Then the coil 18 passes between the third coil guide portions $33A_3$ while maintaining its axial position, is shifted by half a coil thickness axially at the second corner portion A2, and then passes between the fourth coil guide portions $33A_4$. The coil 18 is thereby shifted axially by half a coil thickness at each of the first and second corner portions A1 and A2 as it is wound around the first tube body 32a for one turn.

The coil 18 passes between the fifth coil guide portions $33A_5$, is shifted by half a coil thickness axially at the third corner portion A3, and then passes between the sixth coil guide portions $33A_6$. Then the coil 18 passes between the seventh coil guide portions $33A_7$ while maintaining its axial position, is shifted by half a coil thickness axially at the fourth corner portion A4, and then passes between the eighth coil guide portions $33A_8$. The coil 18 is thereby shifted axially by half a coil thickness at each of the third and fourth corner portions A3 and A4 as it is wound around the second tube body 32b for one turn.

Consequently, in Embodiment 3, because the coil 18 is also shifted axially by half a coil thickness at each of two circumferentially contiguous corner portions A1 through A4 as it is wound around the first and second tube bodies 32a and 32b for one turn, similar effects to those in Embodiment 1 above can also be achieved.

Because the coil guide portions $33A_1$ through $33A_8$ are disposed on side surfaces of the first and second tube bodies 32a and 32b that are positioned on opposite sides of the corner portions A1 through A4 in close proximity to the corner portions A1 through A4, mechanical winding of the coil 18 onto the bobbin 30A is facilitated, enabling automation of the process of winding the field coil 19.

Moreover, in Embodiments 1 through 3 above, the number of magnetic poles (2n) in the rotor 6 is twelve and the cross-sectional shape of the coil mount portions 22 is a hexagon, but if the number of magnetic poles (2n) in the rotor is fourteen, the cross-sectional shape of the coil mount portions should be a heptagon, and if the number of magnetic poles (2n) in the rotor is sixteen, the cross-sectional shape of the coil mount portions should be an octagon. In other words, if the number of magnetic poles in the rotor is 2n, where n is an integer, then the cross-sectional shape of the coil mount portions should be an n-sided polygon.

Embodiment 4

Figure 13:
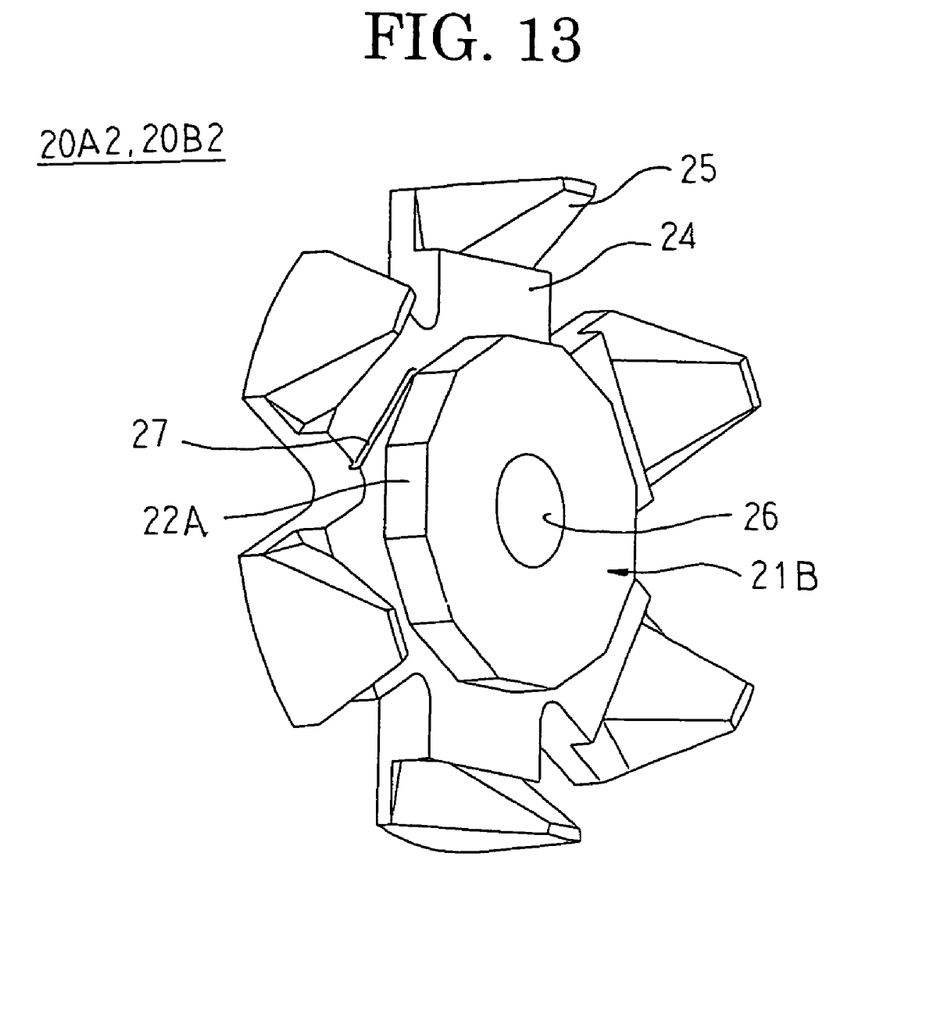
FIG. 13 is a perspective of a divided pole core in an automotive alternator rotor according to Embodiment 4 of the present invention.

FIG. 13 is a perspective of a divided pole core in an automotive alternator rotor according to Embodiment 4 of the present invention.

In FIG. 13, a coil mount portion 22A of a boss portion 21B is formed into a prism that has a dodecagonal cross-sectional shape. The coil mount portion 22A is formed such that every alternate side faces a radially-inner surface of a claw-shaped magnetic pole portion 25, and the remaining alternate side surfaces are positioned between core flange portions 24. A leading end portion of the coil mount portion 22A functions as an abutted portion.

Moreover, the rest of this embodiment is configured in a similar manner to Embodiment 1 above.

In Embodiment 4, because the boss portions 21B of first and second pole cores 20A2 and 20B2 are formed so as to have an identical dodecagonal cross-sectional shape, the first and second pole cores 20A2 and 20B2 can be integrated by being disposed so as to face each other so as to be offset by 30 degrees around a central axis such that the claw-shaped magnetic pole portions 25 intermesh with each other, abutting the leading end surfaces of the boss portions 21B, and pressing the shaft 4 into the shaft insertion aperture 26.

In Embodiment 4, the boss portions 21B can also be abutted in a state in which abutted surfaces are aligned if the first and second pole cores 20A2 and 20B2 are rotated around the central axis by 30 degrees and the leading end surfaces of the boss portions 21B are abutted.

Consequently, similar effects to those in Embodiment 1 above can also be achieved in Embodiment 4.

Because the boss portions 21B are formed so as to have a dodecagonal cross-sectional shape from a base portion to a leading end, magnetic path cross-sectional area of the pole core can be maximized, enabling a large magnetic flux to be obtained.

Because the boss portions 21B that are abutted have an identical cross-sectional shape, the shape of the drum portion of the bobbin mounted to the boss portions 21B is simplified, enabling the bobbin to be prepared inexpensively. In addition, because the cross-sectional shape of the drum portion is constant in an axial direction, winding disarray is less likely to occur in the coil, enabling the coil to be wound in a neatly arrayed state.

In addition, because the bobbin can be constituted by a dodecagonal tube body such that the drum portion is mounted so as to be fitted over the two boss portions 21B that are abutted, the construction of the bobbin is simplified, enabling the bobbin to be prepared inexpensively.

Moreover, in Embodiment 4 above, the number of magnetic poles (2n) in the rotor 6 is twelve and the cross-sectional shape of the coil mount portions is dodecagonal, but if the number of magnetic poles (2n) in the rotor is fourteen, the cross-sectional shape of the coil mount portions should be a 14-sided polygon, and if the number of magnetic poles (2n) in the rotor is sixteen, the cross-sectional shape of the coil mount portions should be a 16-sided polygon. In other words, if the number of magnetic poles in the rotor is 2n, where n is an integer, then the cross-sectional shape of the coil mount portions should be a 2n-sided polygon.

In each of the above embodiments, a rotor that can be mounted to an automotive alternator has been explained, but the present invention can be applied to any rotor that can be mounted to an automotive dynamoelectric machine such as an automotive electric motor, an automotive generator-motor, etc.

In the present invention, dimensions between opposite sides of the polygonal cross sections of the coil mount portions are important dimensions that determine magnetic path cross-sectional area of the pole core and are also important dimensions that determine coil space. In addition, dimensions that define the radially-inner surface of the claw-shaped magnetic pole portions are also important dimensions that determine magnetic path cross-sectional area and coil space. Generally, magnetic path cross-sectional area is determined in such a way that magnetic flux densities of identical members in the magnetic circuit are approximately equal. There may also be portions that have higher and lower magnetic flux density depending on various constraints (such as dimensions, heat, cooling, ventilation, radiation, economy, machinability, desired characteristics, loss, etc.)

Furthermore, it is not necessary for the boss portions of the pole core to have an identical cross-sectional shape over their entire axial length; it is only necessary for at least base portions of the boss portions, i.e., portions in a vicinity of root portions of the core flange portions, to have a polygonal cross-sectional shape. In that case, the boss portions need only have an external shape that enables the pole core to be cast and that enables the bobbin to be mounted, and the cross-sectional shape from the base portions to the axial leading ends of the boss portions may also be formed into circles or polygons in which the number of sides is different than in the base portions, etc. In the portions where the cross-sectional shape changes, the cross-sectional shape may be changed abruptly or it may be changed gradually.

What is claimed is:

1. A dynamoelectric rotor comprising:
   first and second pole cores on which are formed integrally:
      a boss portion through which a shaft insertion aperture is disposed at a position of a central axis;
      n core flange portions that are disposed so as to extend radially outward at a uniform angular pitch circumferentially on an outer circumferential edge portion at a first end of said boss portion, where n is an integer; and
      n claw-shaped magnetic pole portions that are disposed so as to extend and taper toward a second axial end from each of said core flange portions,
   said first and second pole cores being disposed such that said claw-shaped magnetic pole portions face each other so as to intermesh and leading end surfaces of said boss portions are abutted with each other;
   a shaft that is press-fitted into said shaft insertion aperture so as to integrate said first and second pole cores;
   a bobbin that is mounted to said abutted boss portions; and
   a field coil that is wound onto said bobbin, wherein a cross-sectional shape of said boss portion that is perpendicular to said central axis at a root portion of said core flange portions is an n-sided polygon, and each of said claw-shaped magnetic pole portions faces a side of said cross-sectional shape of said boss portion that is perpendicular to said central axis at said root portions of said core flange portions.

2. A dynamoelectric rotor according to claim 1, wherein a boundary portion between radially-inner surfaces of said claw-shaped magnetic pole portions and said core flange portions is formed into a straight line that is parallel to said side of said cross-sectional shape of said boss portion that is perpendicular to said central axis at said root portions of said core flange portions and that faces said claw-shaped magnetic pole portion.

3. A dynamoelectric rotor according to claim 1, wherein at least a predetermined range of said boss portion from said root portions of said core flange portions toward a leading end is formed into a polygonal prism that has a cross-sectional shape that is similar to said cross-sectional shape of said boss portion that is perpendicular to said central axis at said root portions of said core flange portions.

4. A dynamoelectric rotor according to claim 3, wherein:
a leading end portion of said boss portion is formed so as to have a cross-sectional shape that is different from said cross-sectional shape of said boss portion that is perpendicular to said central axis at said root portions of said core flange portions; and
a range of said boss portion from said root portions of said core flange portions to said leading end portion is formed into a polygonal prism that has a cross-sectional shape that is similar to said cross-sectional shape of said boss portion that is perpendicular to said central axis at said root portions of said core flange portions.

5. A dynamoelectric rotor according to claim 4, wherein:
said polygonal prism of said boss portion is an n-sided prism;
said bobbin comprises:
a drum portion in which a first n-sided tube body that is fitted over said boss portion of said first pole core and a second n-sided tube body that is fitted over said boss portion of said second pole core are integrated so as to be offset around a central axis such that central portions of respective sides of said first and second n-sided tube bodies intersect; and
first and second bobbin flange portions that are disposed so as to extend radially outward from two ends of said drum portion; and
said field coil is wound onto said drum portion in multiple layers.

6. A dynamoelectric rotor according to claim 5, further comprising a coil housing groove that is recessed into an inner wall surface of said first bobbin flange portion so as to extend from an outer peripheral edge of said first bobbin flange portion to a vicinity of a corner portion of said first n-sided tube body that is positioned forward in a coil winding direction, a winding start portion of said field coil being housed in said coil housing groove.

7. A dynamoelectric rotor according to claim 6, wherein said first bobbin flange portion is formed into an n-sided polygon that corresponds to said first n-sided tube body; and an outer peripheral end of said coil housing groove is positioned at a corner portion of said first bobbin flange portion.

8. A dynamoelectric rotor according to claim 5, wherein a position of said field coil that is wound onto said first and second n-sided tube bodies is shifted axially at a corner portion of said first and second n-sided tube bodies.

9. A dynamoelectric rotor according to claim 8, wherein said field coil is shifted axially by half a coil thickness at each of two corner portions while being wound for one turn around said first and second tube bodies.

10. A dynamoelectric rotor according to claim 9, wherein said field coil is shifted axially by half a coil thickness at each of two circumferentially contiguous corner portions while being wound for one turn around said first and second tube bodies.

11. A dynamoelectric rotor according to claim 9, further comprising coil guide portions that are disposed on side surfaces of said first and second n-sided tube bodies that are on opposite sides of said corner portion at which said field coil is shifted axially so as to be in close proximity to said corner portion.

12. A dynamoelectric rotor according to claim 5, wherein one layer of said field coil is wound onto a first tube body of said first and second n-sided tube bodies, is then passed to a second tube body through a vicinity of a side intersecting portion of said first and second n-sided tube bodies, and is wound onto said second tube body.

13. A dynamoelectric rotor according to claim 12, wherein end portions of a corner portion of said first tube body and a corner portion of said second tube body that are on opposite sides of said side intersecting portion near said side intersecting portion are formed low in such a way that when a 2mth layer of said field coil, where m is an integer, is passed from said first tube body through a vicinity of said side intersecting portion (P) to said second tube body, a coil of said 2mth layer is placed in contact with a coil of a (2m−1)th layer of said field coil that passes from said second tube body through said side intersecting portion to said first tube body.

14. A dynamoelectric rotor according to claim 3, wherein an entire range of said boss portion from said root portions of said core flange portions to said leading end is formed into a polygonal prism that has a cross-sectional shape that is similar to said cross-sectional shape of said boss portion that is perpendicular to said central axis at said root portions of said core flange portions.

15. A dynamoelectric rotor according to claim 3, wherein a corner portion of said polygonal prism of said boss portion is chamfered or rounded.

16. A dynamoelectric rotor according to claim 1, wherein said leading end surface of said boss portion is formed so as to have a cross-sectional shape that is different from said cross-sectional shape of said boss portion that is perpendicular to said central axis at said root portions of said core flange portions.

17. A dynamoelectric rotor according to claim 1, wherein said first and second pole cores are formed so as to have an identical shape.

18. A dynamoelectric rotor according to claim 17, wherein said leading end surfaces of said boss portions of said first and second pole cores are formed so as to have a circular shape.

19. A dynamoelectric rotor according to claim 17, wherein said leading end surfaces of said boss portions of said first and second pole cores are formed into 2n-sided polygons.

* * * * *